INVENTOR
MORRIS J. BIRNBAUM
WILLIAM J. WICHMAN

ATTORNEY

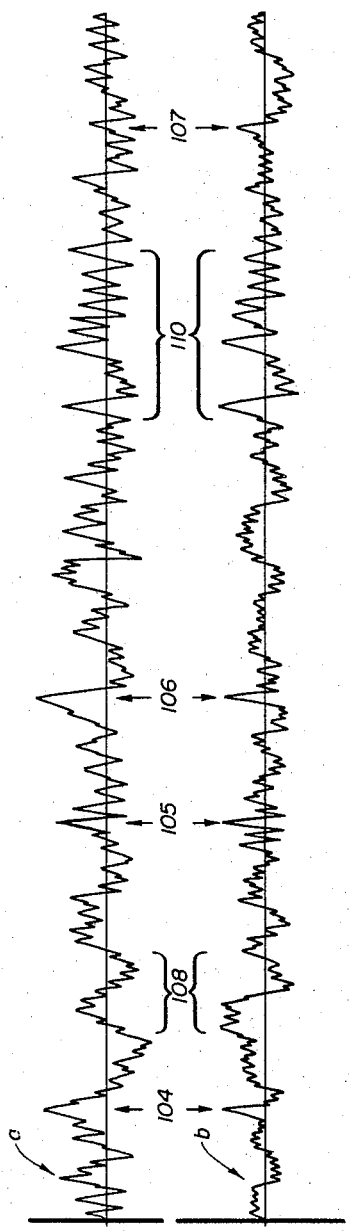
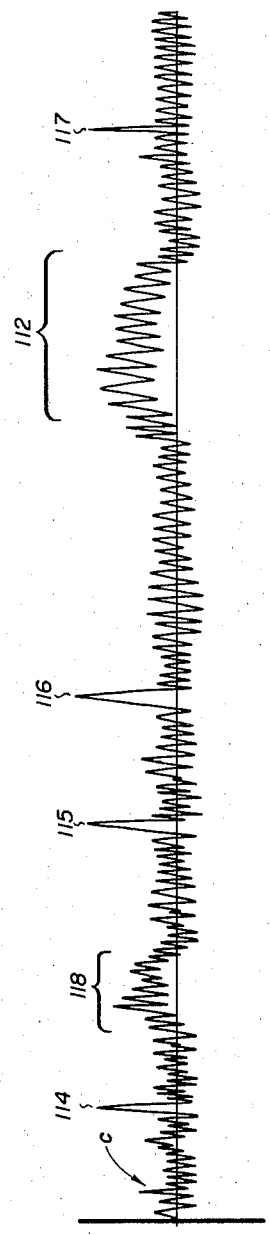
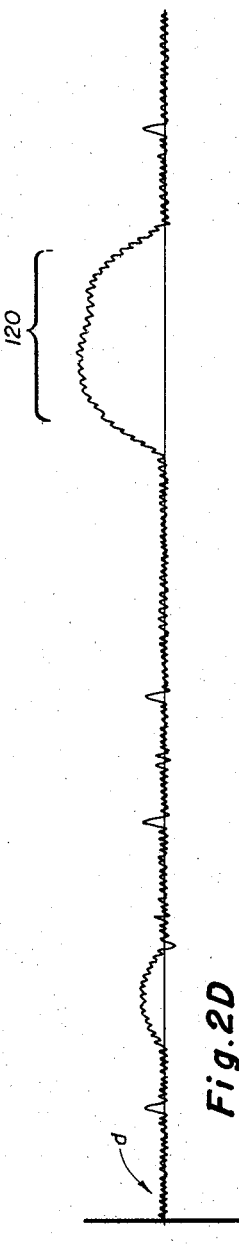
Fig.2A   Fig.2B   Fig.2C   Fig.2D

April 19, 1966   M. M. BIRNBAUM ETAL   3,246,560
APPARATUS FOR ORIENTING AND SCANNING STEREOSCOPICALLY
RELATED PHOTOGRAPHS
Original Filed Jan. 25, 1960                    10 Sheets-Sheet 3

April 19, 1966  M. M. BIRNBAUM ETAL  3,246,560
APPARATUS FOR ORIENTING AND SCANNING STEREOSCOPICALLY
RELATED PHOTOGRAPHS
Original Filed Jan. 25, 1960  10 Sheets-Sheet 5
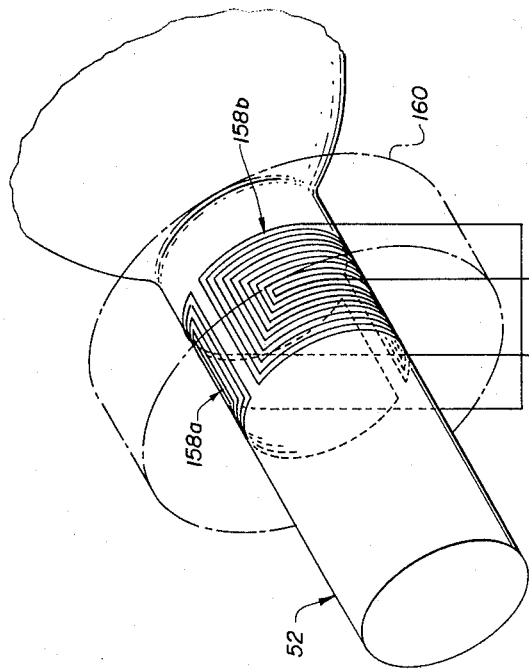
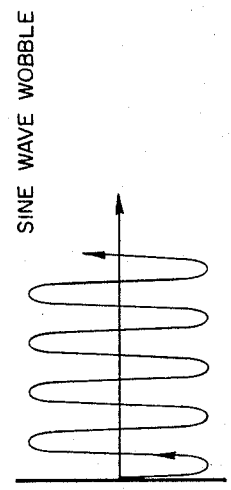
Fig. 10
Fig. 11
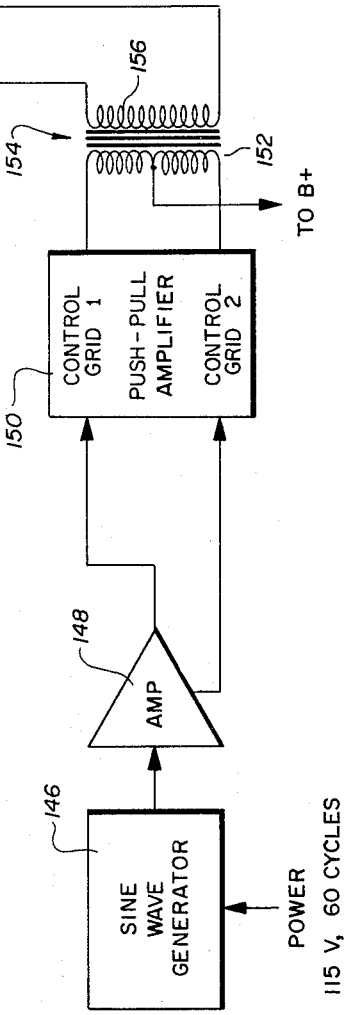
Fig. 12

United States Patent Office 3,246,560
Patented Apr. 19, 1966

3,246,560
APPARATUS FOR ORIENTING AND SCANNING STEREOSCOPICALLY RELATED PHOTOGRAPHS
Morris M. Birnbaum, Pasadena, and William J. Wichman, Burbank, Calif., assignors to General Precision, Inc., a corporation of Delaware
Original application Jan. 25, 1960, Ser. No. 4,404. Divided and this application July 30, 1962, Ser. No. 213,188
1 Claim. (Cl. 88—14)

This is a division of our pending U.S. patent application Serial No. 4,404 filed on January 25, 1960 for an Automatic Contour Plotter, now abandoned.

The present invention relates to a new and improved method and apparatus for the production of topographic maps. More particularly the present invention relates to a novel method and apparatus for the automatic production of topographic maps of the type exhibiting contour lines representing points of equal altitude. Maps of this type are usually made from stereoscopically related photographs, i.e. photographs of the same terrain taken from different points. In practice these photographs are usually taken from airplanes. When two such photographs are projected upon a suitable base in different colors, or with differently polarized light, from different points corresponding to the different points at which they were taken in nature, and the overlapping areas of the two projections are viewed from above by an observer using spectacles whose individual glasses are differently tinted or differently polarized in a manner corresponding to the color or polarization of the projections, the observer appears to see a three-dimensional reproduction of the particular terrain. This is known as a stereo model.

In practice, it is difficult, if not impossible, to photograph an area from two different points of equal elevation under exactly the same conditions. Therefore, when projecting a pair of stereoscopically related photographs with differently colored or differently polarized light upon a common base, it is first necessary to properly align the corresponding areas of the two projections with the aid of points of orientation that appear in both pictures and which may either be clearly discernible land marks, such as rocks, houses, roads and the like, or artificially created marks that were provided in the area under observation prior to taking the photographs. In practice the problem of aligning the common areas of the two projected photographs is complicated by the fact that the airplane may not have been flying at exactly the same altitude or in exactly the same direction when the two pictures were taken, or may have been tilted or tipped in one or the other direction longitudinally and/or transversely of its path of advance. To establish proper alignment of the corresponding areas in the two projections, it is therefore necessary to orient the projected images by raising, lowering, shifting, twisting, tipping and/or tilting one or both projectors in a manner that will compensate for any departure of the two photographs from ideal conditions, i.e. from identical altitude and strictly perpendicular direction of the lens axes at the time the pictures were taken.

When proper alignment of the corresponding areas of the two projections has been established and a true stereo model of the terrain may thus be created in the observer's mind, it is possible for the observer to recognize points of equal altitude at any selected level and to mark these points in the form of continuous contour lines upon a sheet of paper that may have been placed upon the base onto which the two aligned images are projected. To facilitate this operation, the observer may employ a small platform of adjustable height which contains in its center a minute opening that is illuminated from below. This opening appears as a point of light to the observer and as the observer moves the platform across the projection base over areas representing a sloping surface, said point of light appears to lie clearly either above, be clearly in contact with, or to lie clearly below the surface of the stereo model depending on whether the horizontal plane represented by the elevated surface of the platform is higher, of equal height, or lower than the surface of the stereo model, at the center point of the platform. Hence, by observing the point of light created by the center opening of the platform in its relation to the surface of the stereo model, cautiously moving said platform over the projection base in such a manner that said point of light appears to remain in contact with the surface of the stereo model, and guiding a stylus vertically below the center opening of the platform over a sheet of paper secured to the projection base, the observer may draw a contour line containing all points of an altitude corresponding to the altitude represented by the particular vertical adjustment of the platform; and by repeating the process upon readjustment of the platform to different levels, a craftsman may draw a complete topographic map of the terrain under observation having contour lines which indicate selected altitude levels. The precise altitude of said contour lines can readily be determined by comparison with points of the stereo model whose actual altitude is known, and, in fact, the adjusting means of the platform may be provided with calibrations from which the altitude of the contour line plotted at each particular level of adjustment of the platform may be read directly.

The described process of tracing the contour lines of a particular area is slow and cumbersome. It requires intense effort and concentration of a highly skilled and therefore high salaried craftsman, and is subject to errors when the craftsman gets tired and his alertness in observing the position of the point of light relative to the imaginary stereo model begins to fail.

Attempts have previously been made to create apparatus by means of which contour lines may automatically be obtained from oriented, stereoscopically related photographs. In most of these previous attempts, as in the method of the present invention, the oriented diapositives are scanned in synchronism with rays of light that diverge from a common point at a selected level relative to the diapositives, which corresponds to a particular altitude in nature. When the scanning light rays pass through unrelated spots in the two diapositives, they are usually modulated to different degrees, i.e. their intensity is usually reduced in different degrees by the densities of the developed photographic layers at the two spots where they pass through the diapositives. However, when they pass through spots in the diapositives corresponding to one and the same spot in nature, they are modulated in an identical or substantially identical manner, because corresponding spots in the two diapositives have approximately the same degrees of opaqueness. Hence, whenever in the process of scanning the two diapositives in synchronism, the two light rays are modulated to an identical extent, they indicate that they have encountered a spot in nature that is located at a level corresponding to the altitude represented by the level of the point of origin of said light rays.

To understand the reason for this fact, it may be helpful to recall briefly in which manner stereoscopic projectors establish a stereo model. The image-forming light cones of two stereoscopic projectors may be regarded as bundles of light rays, and every one of the spots in the surface viewed by the stereoscopic cameras when the photographs are taken, may be considered as represented by a ray in each of the said light cones. In the merging light cones of properly oriented stereoscopic projectors, such corresponding rays intersect at a level that corresponds to the actual elevation of said spot in nature. If the projectors are adjusted in such a manner that the surface of the projection base corresponds to a certain reference area of the terrain to be mapped, the corresponding light rays for each spot in this area, and in fact for any spot of identical elevation, intersect at the level of the base and thus produce a single image upon the base. The two image-forming rays of a higher spot, however, intersect at a higher level and therefore form two relatively spaced images of inverse relation upon the base, i.e. the image produced by the ray emitted from, say, the right projector is located to the left of the image produced by the ray emitted from the left projector and vice versa; and the higher the position of the spot in nature, the greater will be the distance between the two images upon the base. On the other hand, the two image-forming rays of a spot located below the reference area intersect (theoretically) below the base and therefore form upon the base two images that are spaced from each other by a distance which increases as the altitude of the spot in nature decreases, but these images are in proper relation, i.e. the image produced by the ray emitted from, say, the right projector lies to the right of the image produced by the ray emitted from the left projector. Now, if the surface of the base is raised, what were formerly single images will separate and move apart indicating that the spots they represent are now located below the new reference plane, and what were formerly pairs of inversely positioned double images, may now merge into a single image indicating that the spots they represent in nature are now located in the new reference plane.

To scan two stereoscopically related diapositives for spots in nature that are of the same selected altitude is a reversal of the occurrences involved in the formation of a stereo model. Let us first remember that corresponding spots in the diapositives which depict one and the same spot in nature have generally the same or almost the same density in the diapositives. Hence, when equal amounts of light are passed through two such corresponding spots of the oriented diapositives and are permitted to illuminate two identical photosensitive devices located behind the diapositives, identical or nearly identical responses should be produced in these photosensitive devices. Let us now establish a point source of light in front of the diapositives and assume that the distance between this point source of light and the plane of the diapositives represents a particular level of altitude in nature. Let us then direct a ray of light from said point source through each of two corresponding spots, on the diapositives, which represent a spot in nature that is located at the altitude level represented by the location of the point source of light. As the two light rays pass through the two diapositives at the two corresponding spots thereof, they are modulated by the densities of the photographic layers at said spots in an identical manner and produce identical responses in the photosensitive devices. Let us now scan the two diapositives synchronously with the two rays, i.e. with the points at which they pass through the two diapositives remaining in the initially established relative position. Then, whenever during the scanning process, the two photosensitive devices behind the diapositives register identical or nearly identical responses, they indicate that the correlated points of light which sweep over the two diapositives in synchronism, have encountered corresponding spots in the diapositives that depict a spot in nature, which has the altitude represented by the level of the point source of light relative to the scanned diapositives.

Attempts have been made to devise circuitry that compares the output of the two photosensitive devices and activates plotting mechanism which moves in synchronism with the scanning points of light, over a field corresponding to the terrain represented by the diapositives, to provide a visible mark on said field whenever the circuitry indicates identity of the outputs of the photosensitive device. Thus, circuitry was devised that subtracts the output of one photosensitive device from the output of the other, and which sets mechanism into motion whenever the resultant difference approximates zero, to produce a current that burns a mark through the surface insulation of a sheet of electrically conductive paper.

The results, however, were far from satisfactory. First of all it proved to be difficult to scan the two oriented diapositives in perfect synchronism with two points of light of sufficient fineness to provide a high degree of resolution for the many points of which a photograph is composed, especially if the scanning was to occur with any degree of speed. Most harmful, however, was the fact that systems of the type described are liable to respond and indicate a point of the proper altitude when the scanning points of light encounter spots on the diapositives that intercept the same amount of light due to the fact that they have accidentally the same degree of density, but which are not in fact corresponding spots in said diapositives. As a result thereof, contour maps produced by these known methods show spurious marks indicating equal altitude where there is no such elevation in nature. In addition, the known methods of automatically tracing contour lines produced unreliable results for the reason that the marking devices were not sufficiently sensitive compared with the optical scanning mechanism and the electronic match-determining systems, producing at times marks of improper location and/or length which impaired the clarity and reliability of the resultant contour lines.

It is an object of our invention to provide an improved apparatus for orienting stereoscopically related photographs preparatory to employment thereof in the production of topographic maps.

More particularly, it is an object of our invention to provide an apparatus for orienting stereoscopically related photographs preparatory to their employment in the production of topographic maps, which may readily be adjusted to place into effective position relative to the oriented photographs, the scanning means necessary to determine contour lines of selected altitude from said photographs.

These and other objects of the present invention will be apparent from the following description of the accompanying drawings which illustrate a preferred embodiment thereof and wherein:

FIGURES 2A, 2B, 2C and 2D are diagrams illustrating responses obtained from a pair of photo multiplier tubes employed in optically scanning oriented, stereoscopically related diapositives, and the manner in which these responses are processed in accordance with our invention to determine the presence of a contour point;

FIGURE 10 illustrates a pattern along which diapositives may be optically scanned in accordance with our invention;

FIGURE 11 illustrates a modified scanning pattern;

FIGURE 12 is a fragmentary perspective of a cathode ray tube employed in the apparatus of the invention, and illustrates the circuit arrangement for controlling its electron beam to trace the pattern shown in FIGURE 10 on the screen of the tube;

Figure 1:
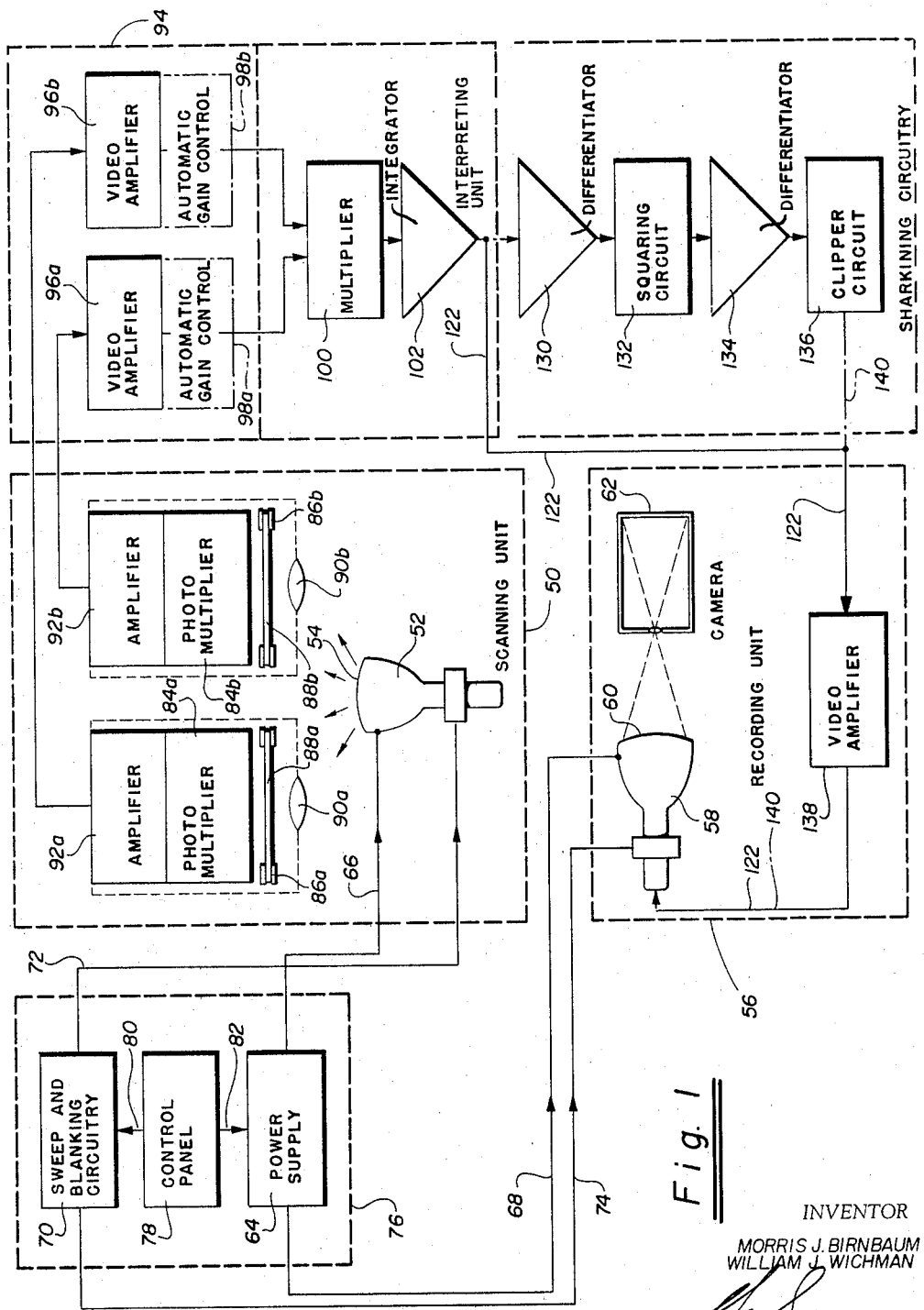
FIGURE 1 is a block diagram illustrating a method of and an apparatus for plotting topographic maps in accordance with our invention.

In accordance with our invention, we scan the oriented diapositives rapidly and in perfect synchronism with two fine points of light. For this purpose we sweep a phosphor screen with an electron beam to produce a spot of light that travels rapidly across said phosphor screen; and by means of appropriately placed lenses we focus bundles of light rays from said spot onto the oriented diapositives. In this manner the two diapositives may be scanned rapidly and in perfect synchronism with small points of light providing a high degree of resolution; and the altitude levels for which the diapositives are to be scanned, may readily be varied without interfering with the established orientation of the diapositives by effectively varying the relative distance between the plane of the diapositives and the phosphor screen.

As regards discrimination in the interpretation of the responses obtained from the photosensitive devices, between truly related spots on the diapositives and points of accidentally equal density, our invention is based upon the realization that the scanning points of light in approaching and passing over related spots, i.e. spots representing one and the same spot in nature, are bound to pass over areas in the diapositives which represent the same area in nature and which are therefore bound to produce increasingly similar and eventually identical responses in the photosensitive devices, whereas the identity of responses produced in the photosensitive devices when the points of light encounter spots in the diapositives that are unrelated and are only accidentally of equal density, is more likely to be an instantaneous and solitary one since the areas surrounding such spots of accidentally equal density will most likely be distinctly different and therefore produce markedly different responses in the photosensitive devices directly before the light points sweep over, and directly after they have swept over these misleadingly identical spots. The contour-identifying system of our invention is further based upon the fact well known from correlation theory that the product of two equal factors is always larger than the product of unequal factors which add up to the same total as the equal factors.

To distinguish equal responses, of the photosensitive devices, which identify a spot of the proper altitude in nature from an instantaneous equality in the responses of said devices produced by accidental identity in the density of unrelated spots encountered by the light points, we provide circuitry that multiplies the output of both photosensitive devices in quick succession and continually integrates and averages a predetermined sequence of the resultant products to determine whether any such integrated and averaged sequence of products of the outputs of the photosensitive devices has a higher than average value. If the number of continually integrated and averaged products is sufficiently large, their sum total will remain substantially the same as long as the scanning points of light do not sweep over truly related spots in the diapositives, even if they encounter spots of accidentally identical density which produce sporadically equal responses in the photosensitive devices; for the peaks thus produced by the multiplication of equal factors are solitary and do not appreciably affect the general trend of the integrated products. However, if the scanning light points sweep over related areas in the two diapositives, the outputs of the two photosensitive devices are not only identical as the light points pass over precisely the related spots, but they will be nearly identical for some time before the light points reach said spots and for some time after they have passed over said spots, establishing thus a sequence of products of identical and/or nearly identical factors which in turn produce a pronounced increase in the value of the averaged integrated intervals, as compared with the average value obtained by continually integrating and averaging an advancing sequence of the products of the outputs of the photosensitive devices. Such an extraordinary increase in the average value of an averaged integrated sequence of the products of two variables is known as a "correlation excess."

In accordance with our invention we employ the appearance of a correlation excess in the value of continually integrated sequences of output products to actuate mechanism for visually indicating points of a desired contour line. In particular we employ the appearance of such a correlation excess to modulate an electron beam that sweeps a phosphor screen corresponding in area to the area of the diapositives swept by the scanning phosphor screen, in synchronism with the electron beam that produces the point source of light for the scanning operation, in such a manner that the identified contour points appear as bright spots on said screen. Thus, a bright contour line representing points of a selected altitude of the terrain recorded on the diapositives appears on the screen, whereat it may be photographed to secure a permanent record.

Having first reference to FIGURE 1, the box 50 identifies the scanning unit which comprises a cathode ray tube 52 having a phosphor screen 54 which is of such chemical composition that it produces a small spot of intense light wherever it is impinged upon by the stream of electrons emitted from the cathode of the tube. The composition of the phosphor screen is also such that its luminescence under the impact of an electron beam is only of the briefest duration, i.e. 2 microseconds. A phosphor screen of this type is available on the market as P-15 Phosphor Screen.

The box 56 identifies the recording unit of our apparatus, which comprises another cathode ray tube 58 that has a phosphor screen 60 similar to the phosphor screens of television receivers, which is of such composition that the luminescence produced by impingement of the electron stream emitted from its cathode is somewhat retentive; for instance, a screen known as P-2 Phosphor Screen operates in the required manner. Located in front of the screen 60 of said tube 58 is a camera 62 by means of which any picture produced on the screen 60 may be permanently recorded. Both the tubes 52 and 58 have a common power supply indicated by the block 64 and the lines 66 and 68, and also common sweep and blanking circuitry identified by the block 70 and the lines 72 and 74, which cause the beams of electrons produced by energization of the tubes 52 and 58 to sweep rapidly in synchronism along successively lower lines across the screens 54 and 60, respectively, from one corner to the diametrically opposite corner thereof. In practice we have found that a speed of 50 sweeps per second will produce satisfactory results for the purpose of our invention. The power supply 64 and the sweep and blanking circuitry 70 may be structurally combined into a unit indicated by the box 76, and their controls may be located on a common control panel symbolically represented by the box 78 and the arrows 80 and 82.

Apart from cathode ray tube 52, the scanning unit comprises two photo multiplier tubes represented by the blocks 84a and 84b, which are located above the screen 54 of the cathode ray tube 52, and mounted in front of said tubes are frames 86a and 86b, respectively, within which the stereoscopically related diapositives 88a and 88b of a terrain to be mapped may be held in their proper positions. In practice these frames are mounted in such a manner that they permit such adjustment in the position of the diapositives as will establish proper orientation thereof. Located in front of the frames 86a and 86b are lenses indicated at 90a and 90b, respectively, and when energization of the tube 52 and activation of the sweep and blanking circuitry 70 causes an intense spot of light to sweep across the screen 54, the lenses 90a and 90b throw images of said point of light onto the diapositives 88a and 88b, respectively, and illuminate the photo multiplier tubes 84a and 84b behind said diapositives. The current flow produced in the photo multiplier tubes 84a and 84b by illumination of said tubes varies depending upon the manner in which the light is modulated as it passes through the oriented diapositives, and the resultant current fluctuations at the anodes of said photo multiplier tubes may be amplified in amplifiers identified by the blocks 92a and 92b.

The preamplified output of the two photo multiplier tubes is conducted to the unit which compares and interprets these outputs in accordance with our invention to determine whether they are identical and, if so, whether they represent truly related points in the diapositives or whether they represent merely a spurious coincidence in the response of the tubes caused by accidentally identical densities in said diapositives. In the schematic illustration given in FIGURE 1, said tube response interpreting and processing unit is represented by the box 94. Said unit should be carefully screened from the remaining circuitry of the apparatus, and especially from the power circuitry enclosed in box 76. In unit 94, the preamplified outputs of the photo multiplier tubes 84a and 84b may first again be amplified in separate video amplifiers identified by the blocks 96a and 96b, and may then be adjusted to comparable levels in automatic gain control circuitry represented by the blocks 98a and 98b which are drawn in broken lines to indicate that such gain control circuitry is desirable under certain circumstances, but is not essential for obtaining contour lines in accordance with our invention. In passing through the amplifiers 96a and 96b, the preamplified outputs of the photo multiplier tubes are filtered to remove the D.C. components of the signals and to eliminate the effect of the blanking impulses applied to the cathode ray tube 52, in a manner to be explained in greater detail hereinafter in connection with FIGURE 13.

The two amplified and adjusted A.C. voltages thus obtained are now delivered to a multiplier circuit identified by the block 100 wherein they are continually multiplied with each other. The resultant products are delivered to an integrator circuit represented by the triangle 102, wherein a predetermined sequence of the products is continually integrated and averaged.

Having now reference to the diagrams shown in FIGURES 2A and 2B, let it be assumed that the graph "a" represents the amplified A.C. output of photo multiplier tube 84a as delivered to the multiplier circuit 100, and graph "b" represents the amplified A.C. output of photo multiplier tube 84b. The two graphs differ markedly most of the time, but have several momentary points of coincidence as marked out by the arrows 104, 105, 106, 107 and the brackets 108 and 110. These points of coincidence are of brief duration and represent instances when the scanning points of light swept over spots in the diapositives, that are of accidentally identical density, and are not related spots in the diapositives that represent one and the same spot in nature. In the region marked by the bracket 110, however, the graphs a and b developed a congruence of some duration indicating that the scannning points of light swept over truly related areas in the two diapositives.

The graph "c" shown in FIGURE 2C below graphs "a" and "b," in FIGURES 2A and 2B, respectively represents the product of simultaneous values of the voltages represented by the graphs a and b. While graph c exhibits a marked rise 112 in the region 110 where the graphs a and b have a congruent course, they also exhibit marked rises at other points, such as identified by the numerals 114, 115, 116, 117 and the bracket 118, which although of lesser duration than the rise 112, might be sufficiently pronounced to produce a spurious response of the contour indicating means of the apparatus of our invention.

Figure 3:
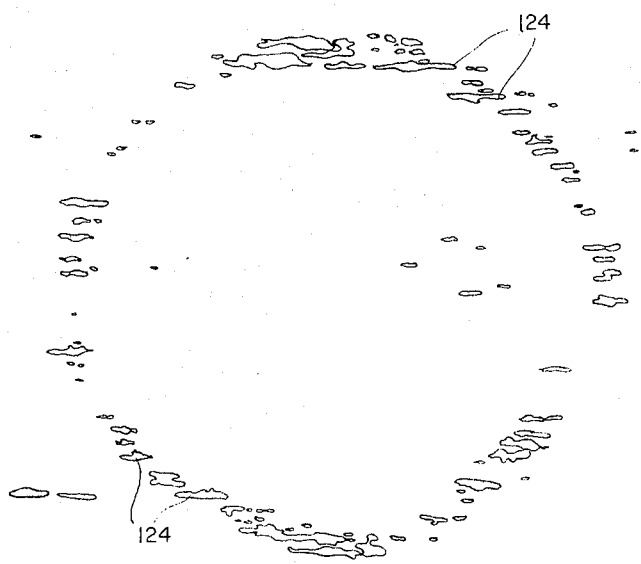
FIGURES 3 and 4 are reproductions of actual photographs of contour marks obtained with the apparatus illustrated in FIGURE 1.

In accordance with our invention we therefore integrate progressively, a predetermined number of the products represented by the curve c and divide each resultant sum by the number of products contained therein arriving at values represented by the formula:

$$E = \frac{1}{T}\int_0^T a \cdot b \, dt$$

wherein T is the time interval required to integrate a predetermined number of products. The resultant values differ very little form each other as long as the signal levels represented by the graphs a and b remain unrelated and have only sporadic, instantaneous points of coincidence. This is illustrated by the graph d in FIGURE 2D which represents the averaged outputs of the integrator plotted against time. However, as soon as the averaged outputs of the integrator include products resulting from a sequence of equal or nearly equal factors, the graph d develops a pronounced rise 120 over its ordinary course, which is clearly indicative of the fact that the scanning light points are in the process of sweeping over truly related areas in the two diapositives and have therefore found a point in the desired contour line. The responses obtained in the manner illustrated at 120 in FIGURE 2D, are employed for modulating the electron beam of cathode ray tube 56 as schematically indicated by the line 122 in FIGURE 1, so as to produce on screen 60 a visible mark representative of a point in the desired contour line. FIGURE 3 is a reproduction of an actual photograph of marks obtained upon the screen 60 of cathode ray tube 58 by modulating the electron beam of said tube with rises 120 in the averaged output of the integrator circuit 102 when scanning two properly oriented, stereoscopically related diapositives of a relatively flat cone. As shown in FIGURE 3 the marks which represent a point of a selected level along the surface of the cone are bright short lines 124, and by connecting the center points of said lines a true contour line of selected altitude may readily be established. If it is desired, however, to delineate several contour lines representing different altitudes, it is advisable to shorten the marks 124 so as to avoid overlapping of marks representing adjacent but different altitude levels. This may be accomplished by processing each response 120 obtained in the manner illustrated in FIGURES 2A, 2B, 2C and 2D, so as to narrow its time of duration and increase its amplitude.

Figure 5:
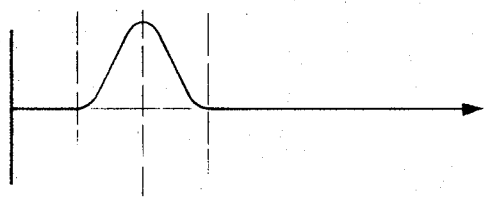
FIGURES 5 to 9 are graphs illustrating a contour identifying voltage response obtained in accordance with our invention and the manner in which said response may be modified to adapt it better for application to a contour indicating apparatus.
Figure 6:
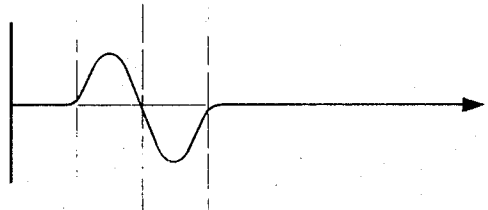
Figure 7:
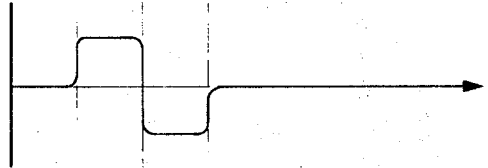
Figure 8:
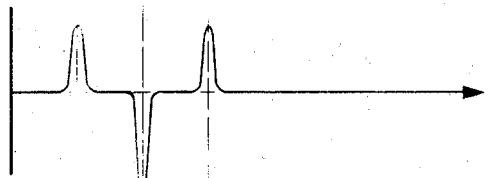
Figure 9:
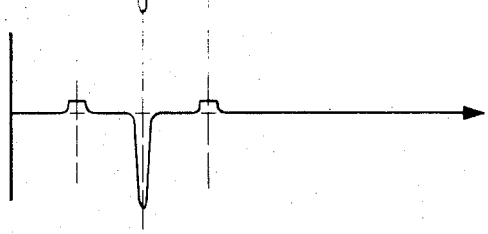

An exemplary method of accomplishing this is illustrated in FIGURES 5 to 9. FIGURE 5 represents a voltage output that is indicative of a point in the desired contour line similar to the rise 120 in graph d of FIGURE 2D. We deliver said voltage output to a differentiator circuit identified by the triangle 130 in the box 94 of the diagram illustrated in FIGURE 1. This differentiator circuit converts the response illustrated in FIGURE 5 into a response as illustrated in FIGURE 6. The output of differentiator circuit 130 may then be delivered to a voltage squaring circuit identified by the block 132 in FIGURE 1, which changes it into the shape illustrated in FIGURE 7. The squared voltage output of circuit 132 is then delivered to another differentiator circuit represented by the triangle 134, whereat the response illustrated in FIGURE 7 is converted into the response illustrated in FIGURE 8. Finally, we pass the signal illustrated in FIGURE 8 through a clipper circuit represented by the block 136 in FIGURE 1, wherein its positive phase is eliminated leaving a narrow negative response of substantial amplitude as illustrated in FIGURE 9. After amplification in a video amplifier represented by the block 138 in FIGURE 1, the clipped and amplified signal may be delivered to the control grid of a cathode ray tube 58, as indicated by the lines 140 and 122, to modulate the electron beam emitted by the cathode of said tube, at the very moment when said beam strikes a point of screen 60 corresponding to the point where the point source of light is located on the screen 54 of cathode ray tube 52 at the moment the scanning points of light originating from said source of light encounter the two related areas in the diapositives 88a and 88b which initiated the contour-identifying response in the photo multiplier tubes 84a and 84b.

Thus, as the electron beam of cathode ray tube 52 sweeps continually over the total area of its screen 54 and produces a rapidly shifting point source of intense light, which scans both diapositives in synchronism through the lenses 90a and 90b, and generates continuously responses in the photo multiplier tubes 84a and 84b that are processed in the described manner, the synchronously operating electron beam of cathode ray tube 58 is modulated to indicate a mark on screen 60 whenever the scanning points of light derived from the source of light on screen 54 encounter truly related areas on the diapositives. In this manner all points of the selected altitude in the terrain to be mapped are marked out as bright lines on the screen 60 of tube 58, and due to the retentive luminescene of the phosphor layer on said screen, the complete contour line or lines appear clearly on the screen 60 and may permanently be recorded by the camera 62; and after changing the effective distance between the point source of light on screen 54 of cathode ray tube 52 and the diapositives 88a and 88b, the process may be repeated to produce on the screen 60 of cathode ray tube 58 another contour line representing points of a different level. By repeating the described process several times at selected different levels of the point source of light relative to the oriented diapositives, and each time photographing the contour lines appearing on screen 60 by re-exposure of one and the same film or plate in camera 62, a complete topographical map indicating a plurality of equi-spaced levels may be produced automatically in a very short time without any human intervention.

Figure 4:
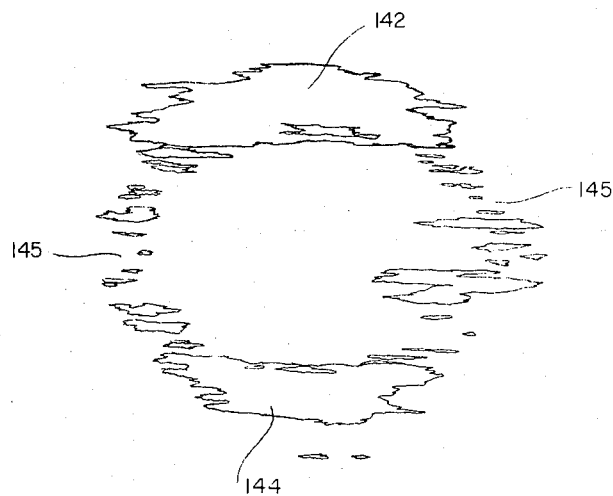

We have found that improved discrimination between truly related spots on the diapositives and spots of accidentally similar density may be obtained by sweeping the synchronized points of light across the diapositives in sine wave lines rather than straight lines. FIGURE 10 illustrates this manner of scanning the diapositives. It should be noted, however, that in FIGURE 10 the length of the individual waves of the sine wave wobble is greatly exaggerated as compared with their amplitudes for clarity of illustration. The reason why scanning patterns such as illustrated in FIGURE 10 provide superior discrimination is that each spot of the diapositives over which the scanning point of light would ordinarily sweep but once, is approached from several directions when employing a scanning pattern such as illustrated in said FIGURE 10. Thus, the scanning light points do not only examine each two corresponding spots on the diapositives to determine whether they are of identical density; they also examine the area above and below these spots, and thus produce a greater number of equal responses in the photo multiplier tubes if the areas around the scanned spots are identical—which they will be if the two examined spots are truly related spots depicting one and the same spot in nature. As a result thereof, a contour-point-identifying response from the correlation circuitry of our invention is more pronounced when the diapositives are scanned along patterns such as illustrated in FIGURE 10, than the responses obtained when the scanning light points sweep in straight lines over the diapositives, as compared with the spurious responses obtained when the light points encounter spots on the diapositives that are only accidentally of the same density. Thus, better discrimination between truly related spots and accidentally similar spots is obtained as illustrated in FIGURE 4. The contour line shown in FIGURE 4 was obtained from the same diapositives that were employed to obtain the contour marks shown in FIGURE 3. In the case of FIGURE 4, however, a vertical wobble of 50 kilocycles was superimposed upon the electron beam of the cathode ray tube 52 as it swept the screen 54 thereof at a frequency of 50 sweeps per second. FIGURE 4 shows that where the sine wave wobble of the light source is approximately perpendicular to the contour that is being drawn, the correlation excess is at a maximum, as apparent from the top and bottom arcs of the contour which are represented by solid white bands 142 and 144. At the left and at the right of the contour, however, where the wobble is approximately parallel to the scanned contour, the correlation excess is much smaller as indicated by the fact that dark areas 145 appear between the contour identifying marks. To remedy this directional quality in the effectiveness of scanning points of light that sweep the diapositives in a wave pattern, the points of light may be swept over the diapositives in a rosette pattern such as illustrated in FIGURE 11.

To cause the scanning points of light to follow the patterns illustrated in FIGURES 10 and 11, it is merely necessary to provide means for influencing the electron beam emitted from the cathode of tube 52 in such a manner that the point of light produced by impingement of the electron beam on the phosphor screen 54 follows the desired pattern, instead of sweeping across the phosphor screen in straight parallel lines. Deflection coils and circuitry for controlling the path of an electron beam of a cathode tube in sweeping across the phosphor screen thereof, are well known in the art and do not by themselves form a part of this invention. However, FIGURE 12 illustrates the manner in which the electron beam of cathode ray tube 52 may be caused to trace a sine wave pattern, such as shown in FIGURE 10, on the phosphor screen 54. The block 146 represents a since wave oscillator of conventional design, which may be tuned to, say 50 kc. The output of the sine wave oscillator is amplified in a voltage amplifier represented by the triangle 148, and voltages of equal magnitude but opposite polarity derived from the plate and cathode respectively of the amplifier 148 are applied to the two control grids of a push-pull amplifier 150. The outputs appearing in the plate circuits of the push-pull amplifier are applied to the opposite ends of the center-tapped primary 152 of a power transformer 154. The secondary 156 of said transformer delivers the total output of the push-pull amplifier to two series-connected spiral coils 158a and 158b that are secured directly to the neck of the cathode ray tube 52 at either side thereof underneath the conventional deflection yoke 160 which forms part of the sweep circuitry 70 and which is shown in phantom lines in FIGURE 12.

Figure 13:
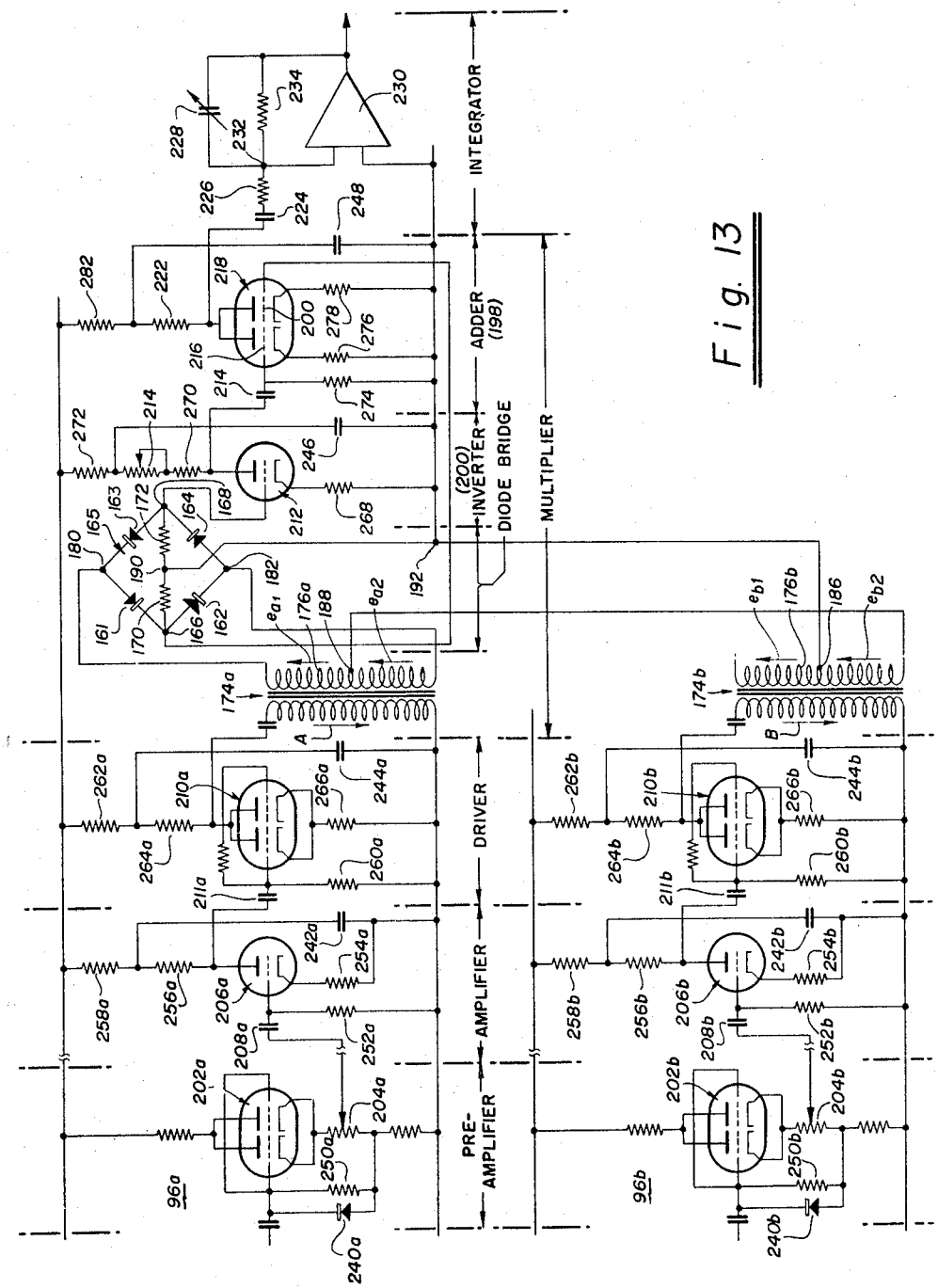
FIGURE 13 is a circuit diagram illustrating a novel multiplier circuit employed in the arrangement of our invention.

All the circuit components of the arrangement illustrated in FIGURE 1, such as the photo multiplier tubes 84a, 84b, the preamplifiers 92a, 92b, the automatic gain control circuits 98a and 98b, the differentiator circuits 130, 134, the squaring circuit 132, the clipper circuit 136 and the video amplifier 138 are of conventional construction, and may readily be connected in the manner illustrated and described by any man skilled in the art. It proved necessary, however, to devise a novel, rapidly operating analog multiplier circuit capable of accurately multiplying the instantaneous outputs of the photo multiplier tubes 84a and 84b at a rate of up to 350,000 products per second. FIGURE 13 is a circuit diagram of the novel multiplier circuit including the circuitry of video amplifiers 96a and 96b.

The multiplier is an analog multiplier that operates on the principle of the "quarter-square" method which is based upon the equation:

$$AB = \tfrac{1}{4}[(A+B)^2 - (A-B)^2]$$

wherein A and B are the two signals to be multiplied.

Having reference to FIGURE 13, the multiplier comprises four diodes 161, 162, 163 and 164 connected to form a bridge circuit 165, and interposed between the left junction 166 and the right junction 168 of the bridge circuit are two resistors 170 and 172 which are of equal value and of a magnitude substantially smaller than the resistances of the diodes in the direction in which they conduct current flow. The two signals to be multiplied are delivered to the bridge circuit by means of two transformers 174a and 174b, respectively, the arrangement being such that the secondary winding 176a of transformer 174a applies one signal across the top and bottom junctions 180 and 182 of the bridge circuit and the other signal is applied from one of the halves into which the secondary winding 176b of the transformer 174b is divided by a center tap 186, across a center tap 188 of the secondary winding 176a of transformer 174a and the junction 190 of the two resistors 170 and 172. The diodes of the bridge 165 are arranged in such a manner as to allow current flow in the left side of the bridge and to block current flow in the right side of the bridge for positive going signals, and to allow current flow in the right side of the bridge and block current flow in the left side of the bridge for negative going signals. Said diodes are matched as closely as possible, and the signal voltage levels applied to said diodes are so dimensioned that the currents flowing through the diodes in a forward direction can be represented by the formula:

$$i = K(e)^2$$

wherein $i$ is the current flowing through the diode in the forward direction, K is a constant of proportionality for the diode involved, and $e$ is the net voltage across the diode in its conducting direction.

Multiplier circuits of the type described give fairly accurate results at frequencies up to 15 kc. However, when operated at substantially higher frequencies, such as is necessary in the correlation circuitry that forms part of the contour plotting arrangement of the present invention, the results obtained become so inaccurate as to be useless. In order that a diode bridge operate satisfactorily as a four quadrant multiplier at high frequencies, it is necessary that its two halves be electrically identical so that the half composed of the diodes 161, 162 and the resistor 170 and the half composed of the diodes 163, 164 and the resistor 172 produce identical voltages across the resistors 170 and 172, respectively, when positive going signals and negative going signals of equal magnitude are delivered to the bridge. In reality, however, the two halves of the diode bridge are rarely, if ever, entirely identical due to inequalities of the diodes employed and especially due to inequalities in the stray capacities across these diodes, which are of increasing significance as the frequency of operation increases; and with a transformer connected across the junctions 166 and 168 of the bridge circuit to measure the algebraic sum of the voltages developed across resistors 170 and 172, there is no way to make adjustment for inequalities in the halves of the bridge circuit so as to render them operationally identical. In fact, the stray capacities between the windings of the transformer add unequally to the stray capacities of the diodes and thus render the responses of the two bridge halves at high frequencies even more unbalanced.

A four quadrant multiplier circuit that operates accurately at frequencies of the order of several hundred kc. may be obtained by grounding the center point 190 of the bridge as indicated by the connecting point 192 in FIGURE 13, by eliminating the output transformer with its harmful stray capacities, and by applying the product voltages developed across the two resistors 170 and 172 separately to the two grids of an adding stage 198, after first inverting one of said voltages in an inverter stage 200 to re-establish the conditions that existed before the center point 190 between the resistors 170 and 172 was grounded when the algebraic sum of the voltages developed across the two resistors could be measured directly across the junctions 166 and 168. When the center point of the diode bridge is grounded, the operation of the bridge becomes more balanced as regards the stray capacities across the diodes to ground, and when the output transformer is eliminated and the product voltages are applied directly to the control grids of a vacuum tube, any spurious high frequency shunt paths established by the stray capaicties of the transformer are practically eliminated since the grid-to-ground capacity of vacuum tubes are orders of magnitude smaller than the stray capacity of transformer coils of standard quality. Moreover, the necessary interposition of an inverter stage between one side of the diode bridge and the adding stage makes it possible, by adjustment of the amplification obtainable in the inverter stage, to compensate for any inequalities in the operation of the two halves of the diode bridge so that the two halves are operationally identical.

Referring again to FIGURE 13, which illustrates the manner in which the multiplier circuit is fitted into the correlation circuitary employed in the automatic contour plotting apparatus of our invention, the video amplifiers 96a and 96b appear at the left side of the diagram. The preamplified outputs of the photo multiplier tubes 84a and 84b (FIGURE 1) are applied to the control grids of dual triodes 202a and 202b, respectively, which are connected to operate as cathode follower stages; and the corresponding voltages developed across cathode resistors 204a and 204b are applied to the control grids of triodes 206a and 206b, respectively, through blocking condensers 208a and 208b. The fluctuations in the plate currents of the triodes 206a and 206b are applied to the control grids of dual triodes 210a and 210b, respectively, through another set of blocking condensers 211a and 211b. The blocking condensers 208a, 211a and 208b, 211b, eliminate the blanking pulses applied to the cathode ray tube 52 from the output voltages of the photo multiplier tubes 84a and 84b and block the D.C. components of said outputs. The triodes 210a and 210b are arranged to operate as driver stages for delivering the amplified and filtered output of the multiplier tubes through transformers 174a and 174b, respectively, to the diode bridge 165 in the manner described hereinbefore.

The product voltages developed across the resistor 172 of the diode bridge are applied to the grid of a triode 212 which forms part of the hereinbefore mentioned inverter stage 200 and which may be adjusted to unity gain so that the voltages appear of equal size but of inverted polarity in the anode circuit of said triode. Included in said anode circuit is a potentiometer 214 by means of which the magnitude of the voltage fluctuations in said circuit may be adjusted to equal the magnitude of the voltage fluctuations developed across resistor 170 of the diode bridge for signals of identical positive and negative magnitude. In this manner the operation of the right side of the diode bridge may be perfectly matched to the operation of the left side thereof so that any inequalities in the operation of the two sides of said diode bridge may be fully compensated. The adjusted voltage fluctuations in the anode circuit of the triode 212 are applied through a blocking condenser 215 to one grid 216 of a dual triode 218, which represents the previously mentioned adder stage 198.

The voltages developed across the other resistor 170 of the diode bridge 165 are applied directly to the other grid 220 of said dual triode 218. The voltages appearing across the resistor 222 in the common anode circuit of the dual triode are indicative of the product of the adjusted and amplified voltages delivered to the diode bridge 165 through transformers 174a and 174b. From the anode circuit of the dual diode 218 these voltages are applied to the integrator circuit 102, through a blocking condenser 224. Graph c of FIGURE 2 exemplifies the voltage output of the triode 218.

The integrator circuit comprises a resistor 226 and a condenser 228 connected in series. Shunted across the condenser is an operational amplifier 230 to maintain the junction point 232 between resistor 226 and condenser 228 at ground potential in spite of the charges applied to the condenser through resistor 226, which charges would otherwise oppose further charging of the condenser to an increasing degree. In this manner the voltage integration in the condenser 228 is rendered more linear and the results obtained are therefore more accurate. Another resistor 234 is connected across the condenser 228 to allow the charge applied to said condenser to leak off at such a rate that the charge remaining at any instant in the condenser is the average of its charged state for a period of time determined by the value of said resistor. Hence, the output of the operational amplifier is a voltage proportional to the voltage $$e = \frac{1}{T}\int_0^T A \times B \, dt$$

which is the time average of the integral of the product $A \times B$. The hereinbefore discussed graph d in FIGURE 2 exemplifies the output of amplifier 230.

Figure 14:
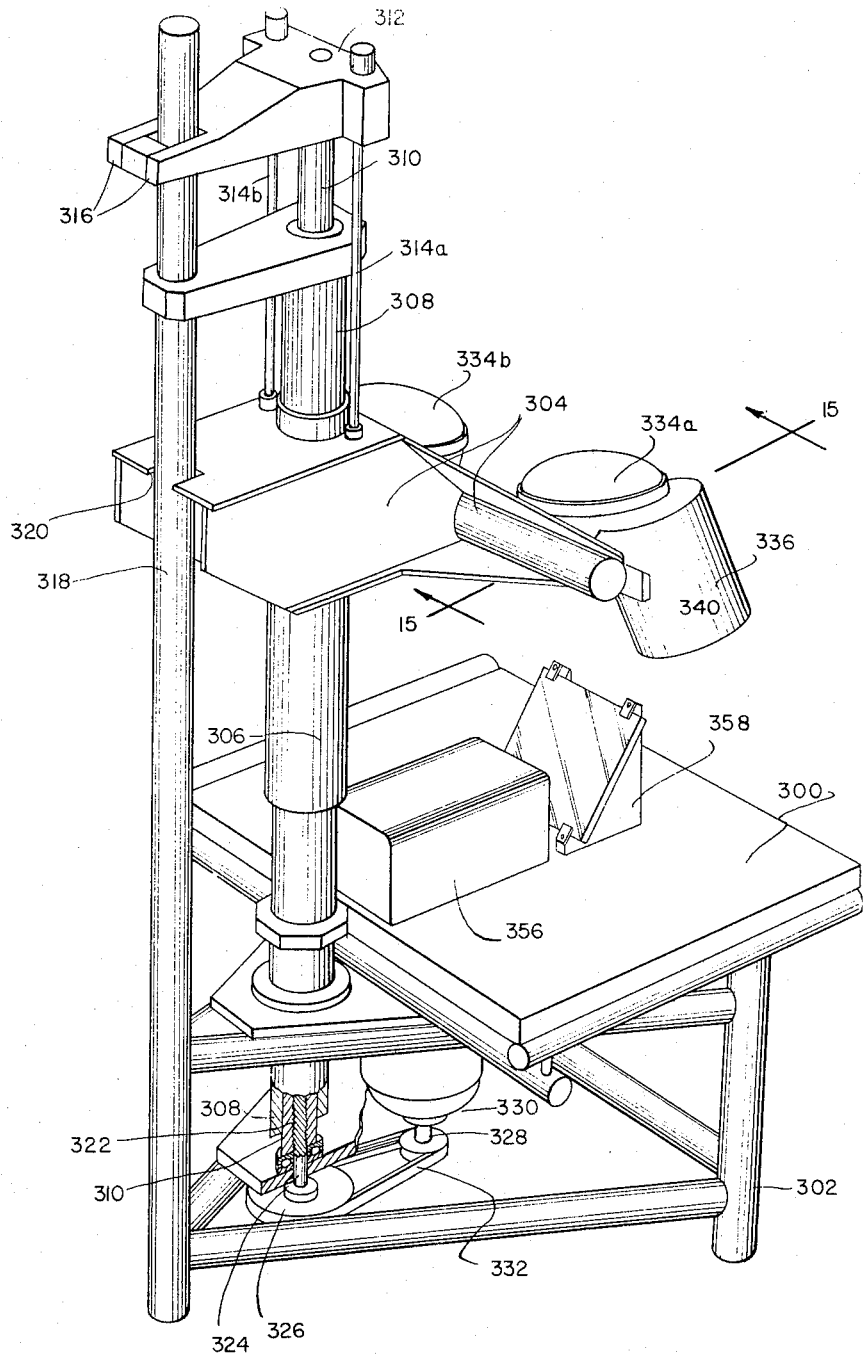
FIGURE 14 is a fragmentary perspective of a practical embodiment of an automatic contour plotting apparatus constructed in accordance with our invention, as viewed from a point in the back of the apparatus.
Figure 15:
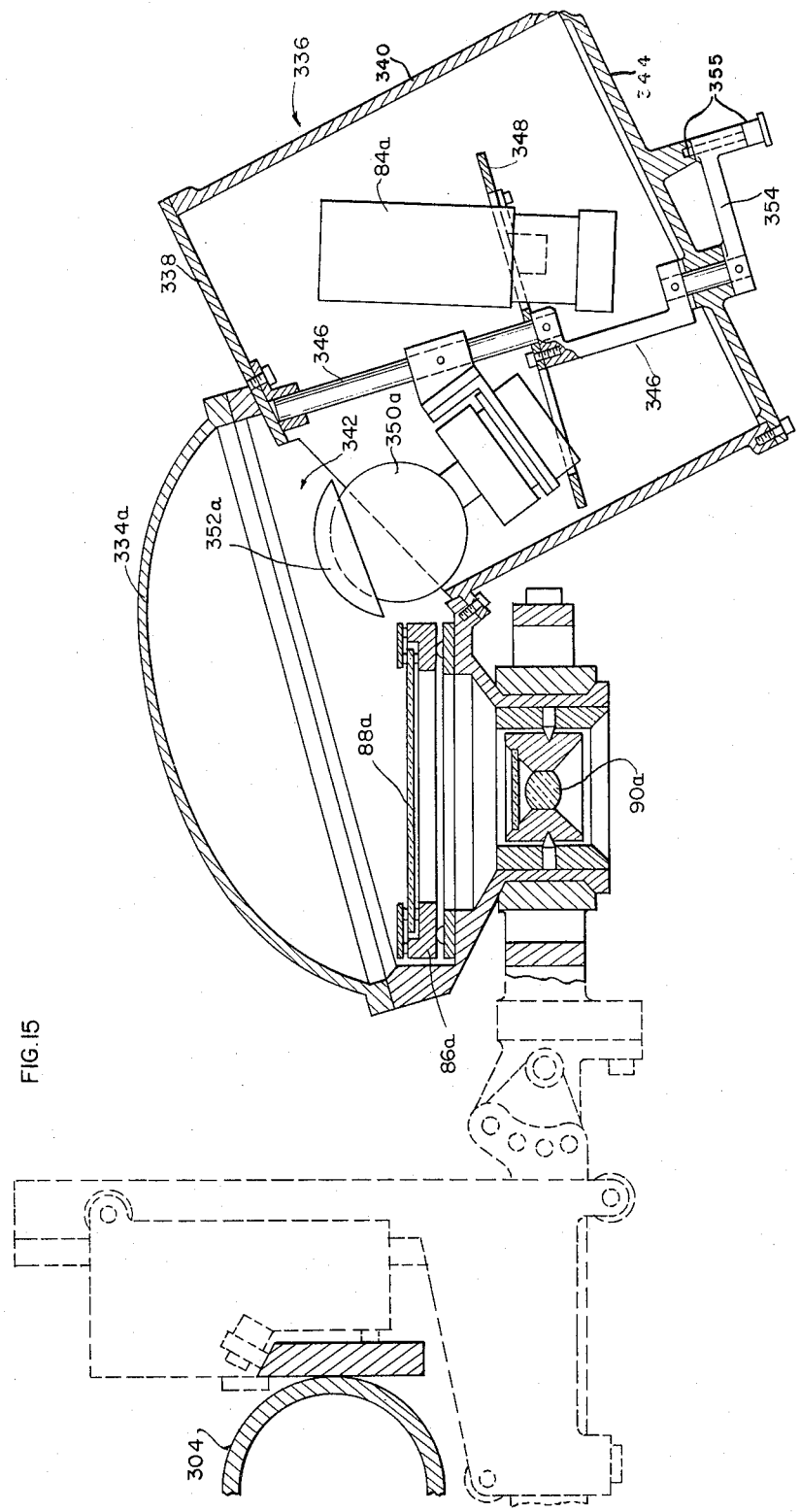
FIGURE 15 is a vertical section taken along line 15—15 of FIGURE 14 and illustrating a mechanism for mounting and orienting a diapositive, and a turret selectively adjustable to place a projecting lamp or a photo multiplier tube into operative position relative to said diapositive.

FIGURES 14 and 15 illustrate the mechanical structure of an exemplary embodiment of a contour plotting apparatus in which the principles of our invention are incorporated, and which is of such construction that it permits both orientation of the stereoscopically related diapositives and optical scanning of the oriented diapositives for contour lines of different altitude, without interfering with the previously established orientation of the diapositives. The apparatus comprises a horizontally placed flat table 300 that is mounted upon a suitable pedestal collectively identified by the reference numeral 302. Arranged above the table plate for vertical movement relative to said plate is a bracket structure 304 from which the projectors and the photo multiplier tubes are supported. The bracket structure 304 is secured to a sleeve 306 which is telescoped over and slides on a vertical post 308 that rises from the pedestal 302 at a point behind the table plate 300. The post 306 is of tubular construction and slidably received within said post is a shaft 310. Mounted upon the upwardly protruding end of said shaft is a block 312 from which the hereinbefore mentioned bracket structure 304 is rigidly supported by a pair of tie rods 314a and 314b. To prevent rotational movement of the shaft 310 within the tubular post 308, said shaft may be keyed to the post 308. In addition the block 312 may be provided with a forked tail 316 that embraces a stationary guide column 318 which rises from the pedestal behind the guide post 308. Similarly the rear portion of the bracket structure 304 may be provided with a recess 320 that embraces said guide column 318. Means are provided for raising or lowering the shaft 310 within the tubular post and in this manner raise or lower the bracket structure 304 and the projectors and multiplier tubes supported therefrom. For this purpose the outwardly protruding lower end of the shaft 310 contains a threaded bore 322 which is engaged by a threaded spindle 324 that is rotatably supported in the pedestal 302 in such a manner that it cannot move in an axial direction. Secured to said spindle is a pulley 326, and the output shaft 328 of a reversible electric motor 330 supported in the pedestal 302, is operatively connected with said pulley 326 by an endless belt 332. By energizing the reversible motor 330 for turning the threaded spindle 324 in one direction, the shaft 310 and hence the bracket structure 304 may be raised in the manner of a screw jack, and by reversing the motor 330 the shaft 310 and hence the bracket structure 304 may be lowered.

Supported from the bracket structure 304 above the table plate 300 are two obliquely positioned dome-shaped reflectors 334a and 334b (FIGURE 15), and arranged below the lower halves of said reflectors are the hereinbefore mentioned frames 86a and 86b for the diapositives 88a and 88b, respectively. Held below the frames 86a and 86b are the projection lenses 90a and 90b.

Figure 16:
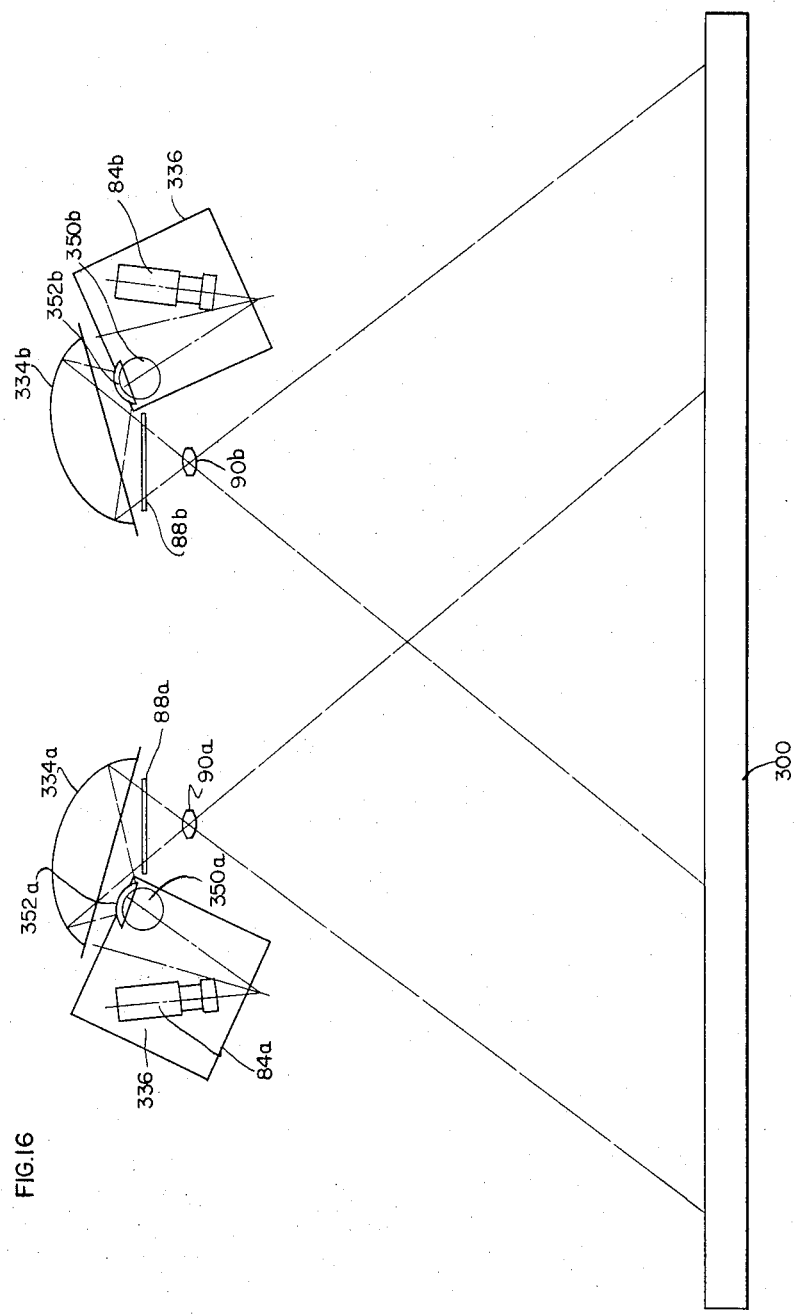
FIGURE 16 is a schematic fragmentary front elevation of the apparatus illustrating its manner of operation when projection lamps are placed into operative position relative to the two diapositives to permit proper orientation thereof.
Figure 17:
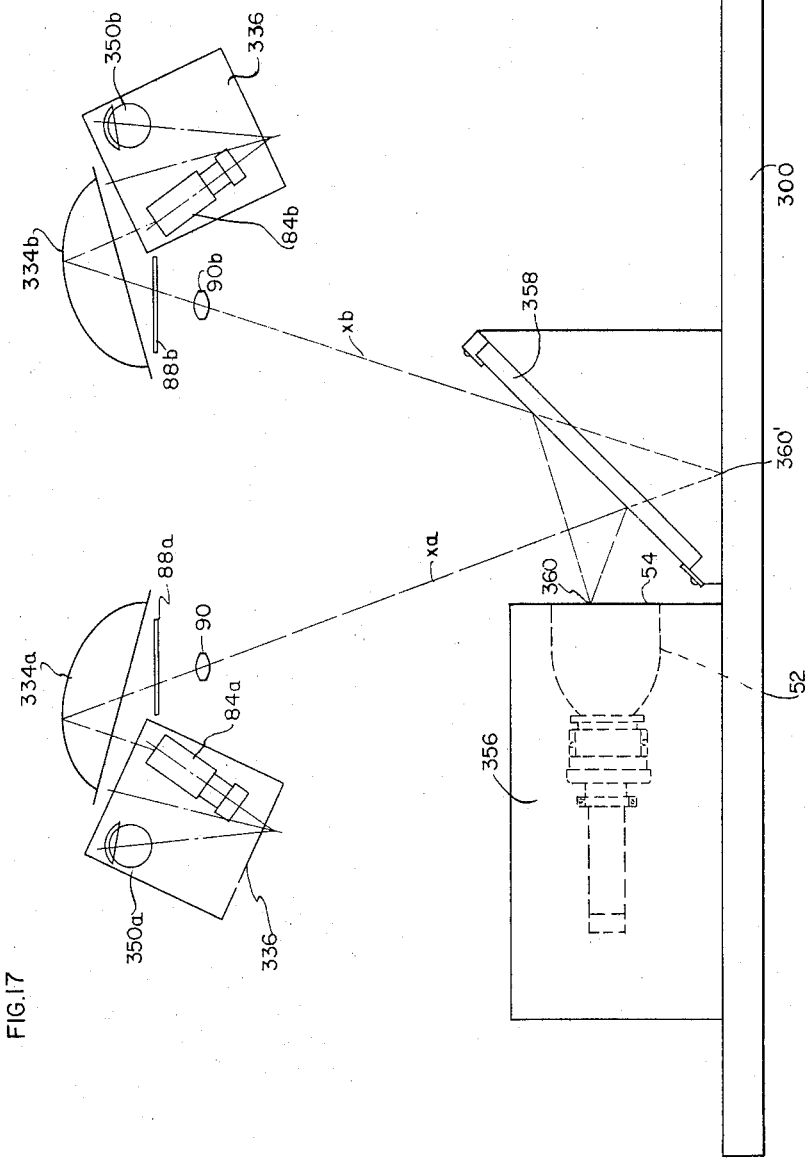
FIGURE 17 is a schematic front elevation of the apparatus illustrating its manner of operation when photo multiplier tubes are placed into operative position relative to the diapositives to sense a contour line of selected altitude from the oriented diapositives.

Supported from a point along the upper segment of each reflector is a turret 336. Each turret comprises a semi-circular lid plate 338 that is firmly secured to the edge of the reflector and which projects beyond the upper segment of the reflector edge, and supported from said lid plate and the adjacent frame 86a or 86b, as the case may be, is a cylindrical enclosure 340 which defines a drum whose upper end is partially covered by the lid plate 338 and is partially left open as shown at 342 to establish communication between the interior of the drum and the space below the reflector. Each turret is closed off by a bottom plate 344, and rotatably held within each turret between the lid plate 338 and the bottom plate 344 thereof is a shaft structure 346 that carries a circular mounting plate 348. Supported from said shaft structure and said mounting plate at diametrically opposite points is a projection lamp 350a or 350b, respectively, and one of the repeatedly mentioned photo multiplier tubes 84a or 84b (FIGURES 16 and 17). Suitably held above the lamps 350a and 350b are different color filters 352a and 352b respectively. The shaft structure 346 extends downwardly through the bottom plate 344, and its protruding end is provided with a crank handle 354 by means of which the shaft structure 346 and the mounting plate 348 may selectively be set to positions wherein either the projection lamp (FIGURES 15 and 16) or the light-sensitive end area of the photo multiplier tube (FIGURE 17) protrudes into the space below the dome-shaped ceiling of the reflector. A spring detent 355 is provided to hold the crank 354 yieldably in either of the above defined positions of adjustment. The conformation of the reflector ceiling, and the position of the lens on the one hand and the projection bulb, or photo multiplier tube, respectively on the other hand is such that depending upon the setting of the crank 354, the described structure will either function as a projector (FIGURES 15 and 16) or as a photo detector (FIGURE 17).

The manner in which the described structures are supported from the bracket structure 304 is such that each may individually be raised or lowered, may be moved within a horizontal plane closer to or farther away from the bracket and may be shifted laterally in one or the other direction relative to said bracket. In addition, each of the described projector structures may be tilted about a horizontal axis parallel to the front edge of the bracket, may be tipped about a horizontal axis perpendicular to the base bar and may be twisted about a vertical axis. A supporting structure capable of such performance has been indicated in phantom lines in FIGURE 15. It is unnecessary, however, and would in fact burden the disclosure of the present invention, to describe this support structure in detail because the very same structure and equivalent structures of different construction, yet capable of the same performance are well known in the art and readily available on the market.

When using the apparatus of the invention in practice to obtain a contour line of selected altitude from two stereoscopically related diapositives, the operator inserts the diapositives into the frames 86a and 86b and places the cranks 354 of the turrets 336 into the position illustrated in FIGURE 16, wherein the lamps 350a and 350b are located in operative position below the reflectors 334a and 334b, respectively, and the apparatus is therefore in condition to perform as a pair of stereoscopic projectors. When the lamps 350a and 350b are turned on, the reflectors 334a and 334b pass their light through the diapositives and the lenses 90a and 90b operate to throw enlarged partially overlapping images of the diapositives upon the top surface of the table 300, as diagrammatically indicated in FIGURE 16. Due to the presence of the filters 352a and 352b these images are differently colored.

An operator wearing spectacles with differently tinted glasses now adjusts the position of the individual projectors in a conventional manner while observing the stereo model formed on the table plate in the area in which the light cones of the projectors overlap, to establish proper orientation of the two images. When orientation has been achieved, the level of the bracket structure 304 may be varied by appropriate operation of the motor 330 to establish a distance between the surface of the table plate and the level of the dispositives that corresponds to the altitude of the contour line which is to be derived from the oriented diapositives. The scanning and contour plotting operation may now commence. The turrets 336 are set to the position illustrated in FIGURE 17, wherein the photo multiplier tubes 84a and 84b receive any light reflected by the reflectors 334a and 334b respectively; and the cathode ray tubes 52 and 56, and the electronic circuitry of the apparatus are energized.

In the diagrammatic illustration of our invention presented in FIGURE 1, the cathode ray tube 52 was represented as facing in upward direction, with the screen 54 thereof lying in a horizontal plane corresponding to the surface of table 300. This is an ideal position, but in practice equally satisfactory results with less radical changes in the structure of contour plotting apparatus available on the market may be obtained by placing the cathode ray tube, safety encased in a box 356, in a horizontal position upon the table as shown in FIGURES 14 and 17. In this position the phosphor screen 54 is vertically disposed, and to re-establish the same conditions as if the phosphor screen of the cathode ray tube were located in the plane of the table surface, a mirror 358 inclined at an angle of 45° relative to the table surface, is placed upon the table surface an appropriate distance in front of the screen of cathode ray tube 52, as likewise illustrated in FIGURES 14 and 17. In practice, we prefer the position of the cathode ray tube 52 and mirror 358 as illustrated in FIGURE 14, wherein the phosphor screen of the tube faces the front of the table, so that the operator may readily observe the source of light produced on the screen. The position of the cathode ray tube 52 and mirror 358 shown in FIGURE 17, has been chosen for reasons of clarity in illustration, because it makes it simpler to indicate in the drawing the center axes $X_a$ and $X_b$ of the light cones originating at the scanning light spot 360 on screen 54, deflected upwardly by the inclined mirror 358 and focussed onto the diapositives 88a and 88b by the lenses 90a and 90b respectively. It also illustrates clearly that the horizontal position of the cathode ray tube in combination with the inclined mirror 358 has for all practical purposes the same effect as if the point source of light 360 travelling over the vertically disposed phosphor screen of the cathode ray tube were actually located in the plane of table 300, as indicated by point 360' wherein the (theoretical) extensions of the upwardly deflected light cone axes $X_a$ and $X_b$ intersect.

As the electron beam of cathode ray tube 52 produces a point source of light 360 that sweeps rapidly over the screen and which is visible to both lenses due to the presence of mirror 358, said lenses focus rays of light from said source of light onto the diapositives 88a and 88b and the resultant points of light on the diapositives sweep rapidly and in perfect synchronism over said dispositives. The reflectors 334a and 334b direct the varying amounts of light passed by the diapositives onto the photo multiplier tubes 84a and 84b, and the resultant voltage fluctuations at the output of the photo multiplier tubes are preamplified in amplifiers 92a and 92b, again amplified in video amplifiers 96a and 96b, and their D.C. components and the effect of the blanking pulses delivered to the cathode ray tube 52 are filtered out as described in greater detail hereinbefore in connection with FIGURE 13. The voltage fluctuations are then applied to the rapidly operating multiplier circuit 100 of the invention and the resultant products are integrated and averaged in the integrator 102 in the manner previously described in detail. Any correlation excess appearing in the output of the integrator 102 may after renewed amplification be used directly to modulate the cathode beam of cathode ray tube 58 so as to produce bright marks on the screen 60 of said tube, that are indicative of points in nature of the selected altitude and which may be photographed with the aid of camera 62. Alternatively, the correlation excess appearing in the output of the integrator 102 may first be passed through sharpening circuitry represented by the components 130, 132, 134 and 136 of the arrangement shown in FIGURE 1, to produce more concentrated marks on screen 60, which make it possible to photograph several separate contour lines representing different levels of altitude upon a single plate or film without danger that the contour defining marks of adjacent contour lines may overlap and impair the clarity of the resulting contour may.

If it is desired to derive contour lines representing different altitudes from the stereoscopically related diapositives, it is merely necessary to set the bracket structure 304 of the machine to different levels by appropriate operation of the motor 330. The setting of the diapositives to different levels relative to the table plate 300 in order to enable the apparatus of the invention to plot contour lines of different altitudes, does not in any way interfere with the initially established orientation of the diapositives.

While we have described our invention with the aid of a preferred embodiment thereof, it will be understood that the invention is not limited to the specific details shown and described by way of example, which may be departed from without departing from the scope and spirit of the present invention. Thus, while we have described a novel multiplier circuit as part of the interpreting circuitry for the photo multiplier outputs, it will be understood that other rapidly and accurately operating multiplier circuits at present in existence or still to be devised in the future, may be employed in the arrangement of the present invention without departing from the scope of our invention.

We claim:

An apparatus for orienting stereoscopically related diapositives and for optically scanning the oriented diapositives for corresponding points of selected altitude, comprising a projection table having a flat top surface, means on said table operable to produce a point source of light sweeping across a predetermined area of the table surface; and mounted above said surface for adjustment to selected levels relative to said surface a pair of structures selectively operable as projectors and as photo-detectors, each of said structures comprising a dome-shaped reflector, a frame adapted to receive a diapositive arranged below one side of said reflector, a lens supported from and below said frame, a rotary support mounted adjacent said frame with a sector thereof disposed below the other side of said reflector and another sector thereof extending beyond the periphery of said reflector, a projection lamp and a photo-sensitive device mounted upon said sectors and means selectively operable to set said support to a position wherein said lamp is disposed below said reflector and a position wherein said photo-sensitive device is located below said reflector, said dome-shaped reflector having an inner light reflecting surface of such conformation that it directs the light from said projection lamp through said frame and said lens onto said table when said support is in a position of adjustment wherein said lamp is located below said reflector, and that it directs light received from said point source of light in the plane of said table through said lens and said frame onto said photo-sensitive device when said support is in a position of adjustment wherein said photo-sensitive device is located below said reflector.

References Cited by the Examiner

UNITED STATES PATENTS

| | | |
|---|---|---|
| 2,283,226 | 5/1942 | Porter. |
| 2,737,846 | 3/1956 | Bean _____ 88—24 |
| 2,912,911 | 11/1959 | Miller _____ 88—57 X |
| 2,964,644 | 12/1960 | Hobrough. |

JEWELL H. PEDERSEN, *Primary Examiner.*